J. C. Delavigne.
Steam-Plow.
No. 76060.      Patented Mar. 31 1868.
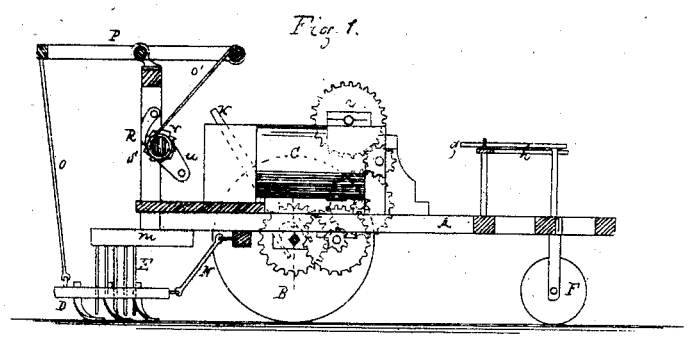
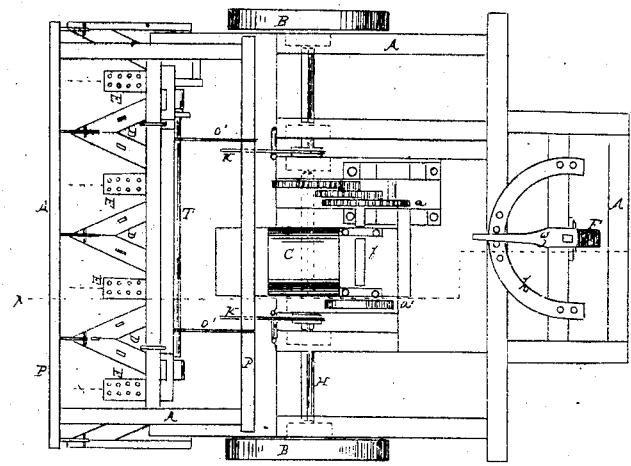
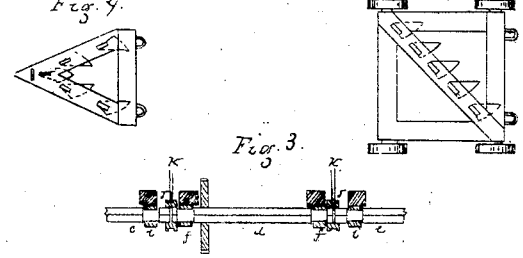
Witnesses:
Inventor:
Jno. C. Delavigne
Per Munn & Co.
Attorneys

United States Patent Office.

JOHN C. DELAVIGNE, OF NEW ORLEANS, LOUISIANA.

*Letters Patent No. 76,060, dated March 31, 1868.*

---

IMPROVEMENT IN STEAM-PLOUGHS.

---

*The Schedule referred to in these Letters Patent and making part of the same.*

---

TO ALL WHOM IT MAY CONCERN:

Be it known that I, JOHN C. DELAVIGNE, of New Orleans, in the parish of Orleans, and State of Louisiana, have invented a new and useful Improvement in Steam-Plough; and I do hereby declare that the following is a full, clear, and exact description thereof, which will enable those skilled in the art to make and use the same, reference being had to the accompanying drawings, forming part of this specification.

This invention relates to a new and improved method of ploughing and cultivating land by steam-power, and the invention consists in providing fenders for the protection of growing plants, and in the combination and arrangement of parts, as will be herein described.

Figure 1 represents a sectional side elevation of the machine, the section being through the line $x\,x$ of fig. 2.

Figure 2 is a top or plan view of the same.

Figure 3 is a detached sectional view of the main shaft or axle.

Figures 4 and 5 are detailed views of the gang-ploughs and cultivators used, showing the form and modifications of the same.

Similar letters of reference indicate corresponding parts.

A represents the platform which supports the steam-engine, and to which the ploughs are attached. B represents the traction-wheels, which are large in diameter, and with broad tires. C is the steam-engine, which is of the portable kind, or with the engine and boiler attached together. D represents the gangs of ploughs or cultivators, which are attached to and operated by the machine. E represents groups of vertical rods, which are placed between the gangs of ploughs, for the purpose of preventing the young plants from being covered by the ploughs. F represents a guide or steering-wheel, attached to the forward part of the machine. This wheel is operated by the lever $g$, and fastened in any desired position by pins through the traverse-bar $h$, as seen in the drawing. The motion and power of the engine are first imparted to the gear-wheel $a$, by means of a pulley, $a'$, on the other end of this wheel-shaft $b$. From this wheel $a$ there is a continuation of gearing down to the main shaft H, to which the traction-wheels B are attached, as seen in fig. 1. The main shaft is in three parts, thus allowing the wheels B to move independently of each other, when desired. This arrangement is seen in fig. 3. The parts of the shaft may be described as $c$, $d$, and $e$. The part $d$ is attached to the frame by box-journals $f\,f$. The parts $c$ and $e$ are also attached to the frame by journals, one of which for each part is seen in the figure, marked $i\,i$. To their outer ends, the wheels B are attached. The parts of the shaft are coupled together by sleeve-couplings, seen at J J, which are operated by levers, marked K. The shaft and sleeve-coupling may be square in its cross-section, and the sleeve slipped over the ends of the parts, as seen in the drawing, or they may be round, and the coupling made to slide on a fin or feather in the parts of the shaft. These shifting-levers are always at the command of the attendant, so that the shaft may be separated when necessary, in turning, &c. In reducing the motion from the speed given by the engine to the gear-wheel $a$ and pulley $a'$, and shaft $b$, to the motion desired for the main shaft H, the power will be increased in proportion to such reduction. The speed of the engine would be, perhaps, one hundred or one hundred and fifty strokes per minute, while the machine would move over the ground with only about the speed of a walking horse. The groups of rods E extend down from the frame to the ground, as seen in fig. 1, for the protection of the young plants. After the plants obtain a sufficiently large growth, and also in breaking up land, they may be removed, as they are attached to blocks $m$, (fig. 1,) which are bolted to the frame.

The form of plough used in this machine may be varied according to the soil in which it is used, consequently I do not confine myself to any particular form, or size, or number, either of the ploughs or cultivators, to be used at one time.

The gangs of ploughs and cultivators are attached to the frame by rods, chains, or ropes, which are marked N, while the depth which the ploughs are allowed to cut is governed by other chains or ropes, marked $o$, which are attached to frame P. This frame is supported on an upright transverse frame, marked R, and to which it is attached by hinges at its middle, so that it can oscillate or rock. S is a windlass on the frame R, the shaft or drum of which extends across the machine, as seen in fig. 2, at T. $o'$ represents ropes or chains, which are attached to the frame P and to the windlass, as seen in the drawing. The windlass is revolved by a crank, $u$, and it is held in place by a ratchet-wheel and pawl, $v$, as seen in fig. 1.

In breaking up the soil, it may be necessary to pass over the ground more than once, to plough up the space between the wheels. In cultivating, the whole space may be finished at one passage of the machine. In both cases the wheels will run on the same track, which track is not to be disturbed by the plough, but left always firm. This is an essential difference between my steam-plough and any one heretofore made.

By using the ordinary portable steam-engine for my plough, it will be seen that the engine can readily be applied to other purposes, as sawing, grinding, driving cotton-gins, &c.

Having thus described my invention, I claim as new, and desire to secure by Letters Patent—

1. The construction and arrangement of the frame A, of any desired size, in combination with the traction-wheels B, substantially as shown and described.

2. In combination with the frame and wheels, the shaft H, formed substantially as described.

3. The arrangement and operation of the gangs of ploughs or cultivators D, and the manner in which the same are controlled, substantially as described.

4. The vertical protecting-rods E, substantially as and for the purposes herein described.

JNO. C. DELAVIGNE.

Witnesses:
G. AGUILARD,
A. BUILZON.